United States Patent
Roberts et al.

(10) Patent No.: US 6,185,896 B1
(45) Date of Patent: *Feb. 13, 2001

(54) SCREW THREADED FASTENER AND FASTENING SYSTEM

(75) Inventors: David James Alexander Roberts, Mornington; Mark Doneddu, Mulgrave, both of (AU)

(73) Assignee: W. A. Deutsher Pty. Ltd. (AU)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/019,718

(22) Filed: Feb. 6, 1998

(30) Foreign Application Priority Data

Feb. 11, 1997 (AU) .................................... PO5029

(51) Int. Cl.⁷ ............................................ E04D 1/00
(52) U.S. Cl. ................... 52/537; 411/386; 411/387; 411/411; 411/414
(58) Field of Search .................. 411/386, 387, 411/414, 411; 52/537

(56) References Cited

U.S. PATENT DOCUMENTS

| | | | |
|---|---|---|---|
| 3,865,006 | * | 2/1975 | Massoney . |
| 4,099,357 | * | 7/1978 | Lester .................................... 52/533 |
| 4,652,194 | * | 3/1987 | Tajima et al. ...................... 411/417 |
| 4,820,098 | * | 4/1989 | Taubert et al. ..................... 411/411 |
| 4,836,730 | * | 6/1989 | Jesson et al. ...................... 411/387 |
| 4,914,886 | * | 4/1990 | Eriksson et al. .................... 52/537 |
| 5,171,186 | * | 12/1992 | Lukes . |
| 5,304,023 | * | 4/1994 | Toback et al. . |
| 5,319,908 | * | 6/1994 | Van Erden et al. ................. 52/410 |
| 5,340,254 | * | 8/1994 | Hertel et al. . |
| 5,403,137 | * | 4/1995 | Grun et al. ......................... 411/387 |
| 5,746,039 | * | 5/1998 | Nystrom . |
| 5,755,542 | * | 5/1998 | Janusz et al. ...................... 411/387 |
| 5,897,280 | * | 4/1999 | Dickie ................................ 411/411 |

* cited by examiner

Primary Examiner—Christopher T. Kent
Assistant Examiner—Nkeisha J. Maddox
(74) Attorney, Agent, or Firm—Schwartz & Weinrieb

(57) ABSTRACT

A screw threaded fastener (103) has an elongate shank (122) with a drilling tip (104) at one end and a head (123) at the other end. A screw thread extends along at least a part of the length of the shank (122). The trailing flank (116) of the thread subtends an angle (B) relative to the axis (117) of the fastener which approaches 90° and is greater than the angle (C) subtended by the leading flank (115). The screw is for use in fixing sheets of material a1 to thin metal battens (5) and the angle between the trailing flank (116) and the adjacent thin metal section (18) of the batten (9), being reduced in comparison to a conventional thread form, lessens the distorting effect of the thread on the batten (9) under relatively high pull-out loads.

20 Claims, 2 Drawing Sheets

SCREW THREADED FASTENER AND FASTENING SYSTEM

TECHNICAL FIELD

This invention relates to the fastening of material to thin metal structures. It will be convenient to hereinafter describe the invention with particular reference to the fixing of roofing or cladding material to battens of thin material section, but the invention has wider application. The invention is concerned with fastening systems of the foregoing kind and is also concerned with a fastening screw for use in such a system.

In the context of this specification the expression "thin metal" is to be understood as referring to metal having a thickness not significantly greater than one millimeter, and more generally in the range 0.4 to 0.8 mm.

BACKGROUND

It is common practice to secure metal roofing material to thin metal battens by means of self-tapping threaded fasteners of the kind having a drilling tip. Selection of such a fastener from the available range of such fasteners is largely determined by the speed with which the fastening operation can be achieved, but the security or strength of the fastened assembly may be compromised in the process. Fastenings of the aforementioned kind have been found to fail particularly in situations involving relatively high wind loading. It has been discovered that such failures are due at least in part to the distorting effect of the thread form of conventional fasteners on the thin metal battens.

OBJECTS SUMMARY OF THE INVENTION

It is an object of the present invention to provide a screw threaded fastener having a modified thread form which enables relatively rapid fastening of one member to another and which provides a secure fastening between those members. It is a further object of the invention to provide a fastening system which is highly resistant to failure.

SUMMARY OF THE INVENTION

According to a first aspect of the invention there is provided a screw threaded fastener including an elongate shank having a longitudinal axis, a drilling tip at one end of the shank and a head at the opposite end, and a screw thread extending over at least a part of the length of the shank, wherein the screw thread includes a leading flank having an angular disposition relative to the longitudinal axis whereby it slopes outwardly relative to the longitudinal axis in a direction away from the drilling tip and a trailing flank directed outwardly relative to the longitudinal axis at a different angular disposition to that of the leading flank, wherein the angular disposition of the trailing flank is closer to 90° than is the angular disposition of the leading flank.

A screw threaded fastener according to the invention is characterized in that the angle subtended between the longitudinal axis of the screw and the trailing flank of the screw thread is greater than the corresponding angle subtended between said longitudinal axis and the leading flank of the screw thread and wherein the trailing flank angle is closer to 90° than is the leading flank angle. This angular disposition of the trailing flank relative to the leading flank of the screw thread, in use of the fastener, reduces the angle between the trailing flank and the adjacent thin metal section of a batten surrounding the fastener. This has a decreased distorting effect on the thin metal batten under pull out loads on the fastener to that produced by the screw thread of a conventional fastener wherein the leading and trailing flanks slope at substantially the same angle relative to the longitudinal axis of the fastener.

In an example arrangement according to the invention the trailing flank angle is substantially 83° as compared with substantially 60° for the leading flank angle. In each case the angle is the inner subtended angle of the relevant flank so that in the example referred to the angle subtended between the two flanks is substantially 37°. It will be appreciated from the foregoing that in the example referred to the trailing flank slopes outwardly from the fastener axis in a direction towards the tip of the fastener shank.

It is preferred that the fastener includes a drilling portion which terminates at the drilling tip and which has two flutes formed therein on diametrically opposite sides of the fastener axis, wherein each flute extends generally in the direction of the longitudinal axis of the fastener. The terminal end of the fastener shank is formed by the tip of the drilling portion, and that tip preferably comprises two terminal end faces each of which slopes outwardly from the fastener axis in a direction towards the head of the fastener.

The maximum cross sectional dimension of the drilling portion, which portion may be substantially cylindrical, may be selected to suit requirements, but it is preferably substantially equal to the root diameter of the thread of the fastener. In some circumstances the aforementioned dimension could be greater or less than the root diameter.

The threaded portion of the screw fastener extends over a suitable part of the shank length and is located between the drilling portion and the head of the fastener. It is preferred that a section of the threaded portion adjacent the drilling portion is tapered so that the crest diameter of the thread progressively increases from a minimum at the end of the threaded portion adjacent the tip portion to a maximum at a location towards the head of the fastener.

According to a second aspect of the invention there is provided a fastening system including at least one thin metal batten having a support wall, a sheet of roofing or cladding material, and at least one screw threaded fastener as described above, wherein the fastener extends through the sheet and its screw thread is threadably engaged in the support wall of the batten so as to thereby attach the sheet to the batten, wherein the trailing flank of the thread extends outwardly approximately parallel to an adjacent surface of the support wall of the batten surrounding the fastener, and wherein further, the trailing flank subtends an angle relative to the adjacent surface of no more than about 10°.

BRIEF DESCRIPTION OF THE DRAWINGS

It will be convenient to hereinafter describe the invention with particular reference to the accompanying drawings which show an example embodiment of the invention. The particularity of the drawings and related description is not to be understood as superseding the preceding broad description of the invention. More particularly, various other objects, features, and attendant advantages of the present invention will be more fully appreciated from the following detailed description when considered in connection with the accompanying drawings in which like reference characters designate like or corresponding parts throughout the several views, and wherein.

BRIEF DESCRIPTION OF THE DRAWINGS

Figure 1:
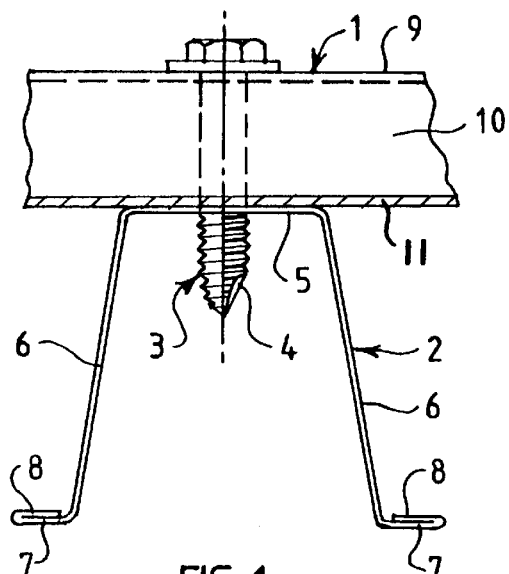

FIG. 1 is a cross-sectional view of a typical prior art fastening system.

Figure 2:
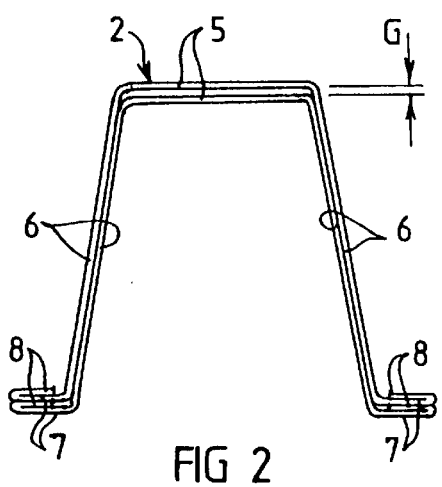

FIG. 2 is an end view of two overlapped thin metal battens for explaining a problem which particular example fasteners according to the invention can overcome.

Figure 3:
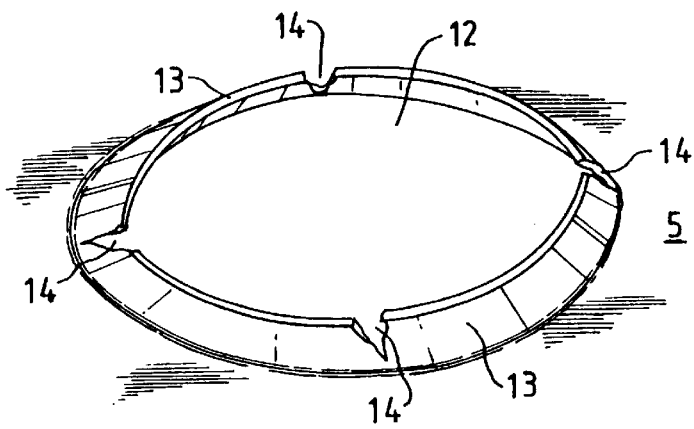

FIG. 3 is a perspective view which diagrammatically illustrates the distortion in a thin metal batten of a failed assembly of a prior art fastener in the batten.

Figure 4:
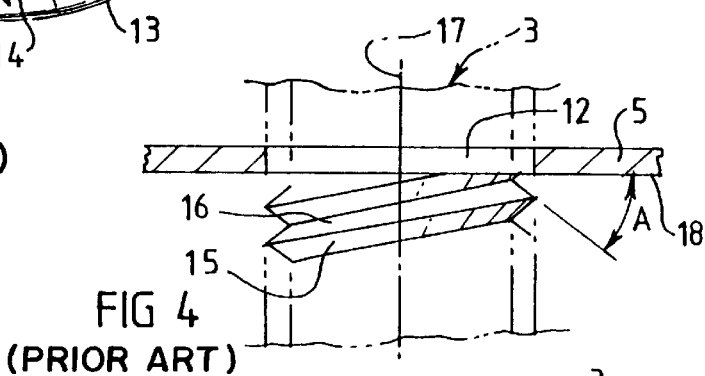

FIG. 4 is a partial sectional view of a prior art fastener thread form in a thin metal batten.

Figure 5:
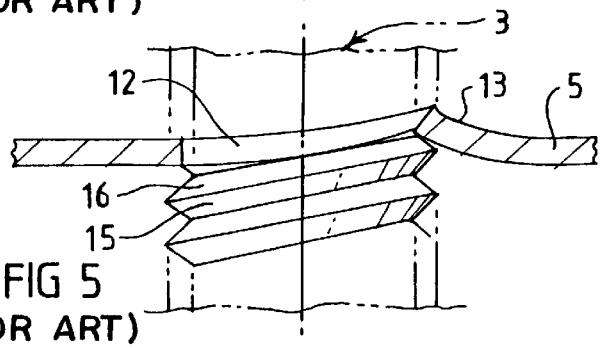

FIG. 5 is a similar view to FIG. 4 illustrating how the prior art threadform can cause the distortion that leads to failure under high pull-out loads.

Figure 6:
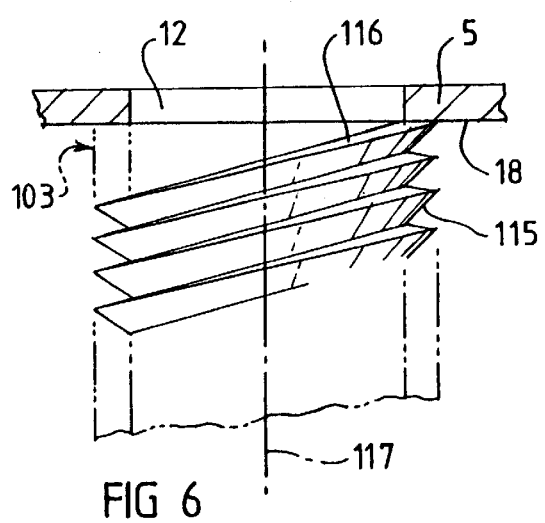

FIG. 6 is a partial sectional view of an example fastener according to the invention in a thin metal batten.

Figure 7:
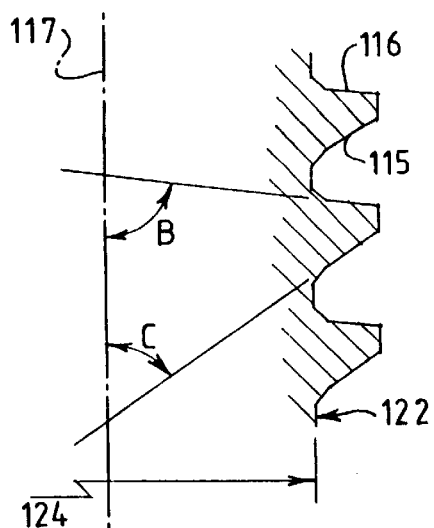

FIG. 7 is an elevational cross sectional view of an example thread form according to the invention.

Figure 8:
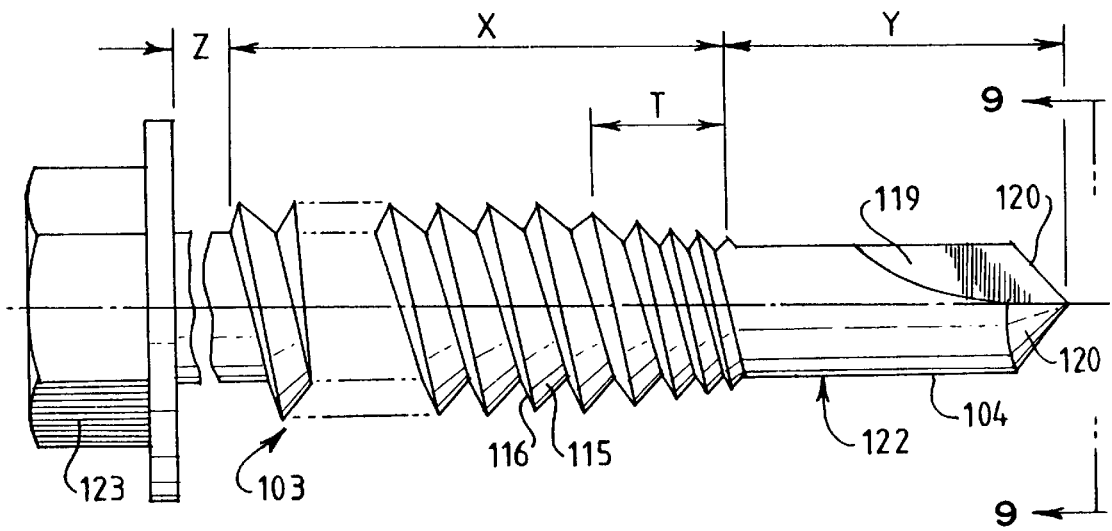
Figure 9:
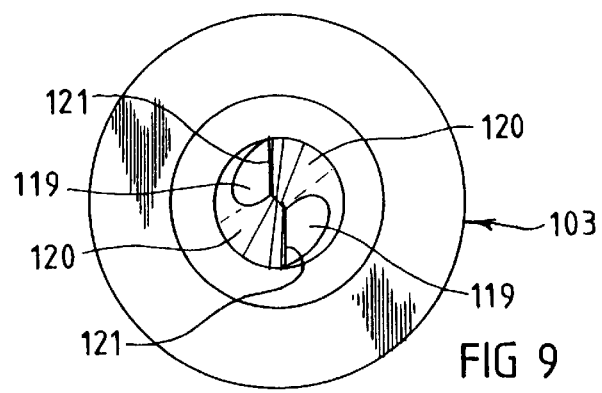

FIG. 8 is a side elevational view of an example fastener according to the invention, and FIG. 9 is a plan view from the drilling tip end of an example fastener according to the invention as taken along the line 9—9 of FIG. 8.

DETAILED DESCRIPTION OF PREFERRED EMBODIMENTS INCLUDING BEST MODE

FIG. 1 illustrates a typical fastening system in which a sheet 1 of roofing material is secured to a thin metal batten 2 by means of a conventional self-tapping screw threaded fastener 3 having a drilling tip 4. The batten 2 is of a typical construction having a body of inverted channel configuration comprising a top wall 5 and a pair of spaced side walls 6. A laterally extending flange 7 is provided along the lower edge of each side wall 6 and, as shown, it is usual to turn back the outer edge 8 of the flange 7 for strengthening purposes. As is well known, sheets of roofing material are generally corrugated or otherwise formed to have alternating ribs and valleys of various shapes. The roofing sheet 1 shown in FIG. 1 is of that construction and as shown the fastener 3 passes through the upper wall 9 of a rib 10 whereas the lower wall 11 of a valley bears against the batten top (support) wall 5.

Battens 2 are generally supplied in standard lengths and it will occur that two or more battens are required to span a required distance. In such cases it is usual practice to overlap adjacent ends of two battens 2 as shown diagrammatically by FIG. 2. As will be apparent from FIG. 2 the double thickness of the flanges 7 prevents the top wall 5 of the upper most batten 2 from engaging the top wall 5 of the lowermost batten 2, and a gap G is thereby formed between the walls 5. The gap G can create a problem when a fastener 3 is being driven into the battens 2 at the region of the overlap. It will sometimes happen that the fastener 3 enters into threaded engagement with the uppermost wall 5 before the tip 4 penetrates into or through the lowermost wall 5, and in that event the uppermost wall 5 will be forced upwards relative to the lowermost wall 5 thereby increasing the size of the gap G and adversely affecting the appearance of the roof construction.

Quite separate from the foregoing problem however, there is a problem of inadequate pull-out resistance in conventional assemblies of the general kind shown by FIG. 1, and that problem exists both outside and inside overlaps as referred to above.

Inspection of failed assemblies has revealed a condition of the kind diagrammatically illustrated by FIG. 3. That figure shows part of the top or support wall 5 of a batten 2 and the hole 12 which is formed through the wall 5 by the drilling tip 4 of a fastener 3. The hole 12 is formed so as to have a diameter which is related to the thread of the fastener 3, and is typically of substantially the same diameter at either the root diameter or the pitch diameter of the fastener thread.

As shown by FIG. 3 the section 13 of the wall 5 which surrounds the hole 12 tends to lift and fracture at a number of zones 14 with the result that the fastener 3 no longer secures the roofing material 1 to the batten 2. Experiments have revealed that such failure of the fastening is due, at least in part, to the thread form used with conventional fasteners 3. An example of that thread form is shown by FIGS. 4 and 5, and it is a characteristic of that thread form that the leading and trailing flanks 15 and 16 respectively of the thread slope at substantially the same angle relative to the fastener axis 17.

When an upward pull is applied to the fastener 3, for example as a result of high wind loading, the trailing flank 16 presses against the under surface 18 of the wall 5 and that is thought to be the cause of the upward distortion of the wall section 13. Tests have indicated that such upward distortion promotes the fracture at the zones 14 as shown by FIG. 3, and also indicate that the relatively large angle A subtended between the thread flank 16 and the wall surface 18 is a major cause of the problem. It is generally the case that the angle A is approximately 30°.

It is against the foregoing background that the thread forms shown by FIGS. 6 to 8 have been developed. For convenience of comparison, parts of a fastener 103 shown by FIGS. 6 to 9 which correspond to parts of the conventional fastener 3 will be given like reference numerals except that those numerals will be in the number series 100 to 199.

A significant feature of the thread forms shown by FIGS. 6 to 8 is the relatively "flat" (approximately 90°) disposition of the trailing flank 116 by comparison with the leading flank 115. In the particular example shown in FIG. 7 the angle B subtended between the trailing flank 116 and the fastener axis 117 is approximately 83°, whereas the corresponding angle C subtended by the leading flank 115 is approximately 60°. That particular thread form is suited to manufacture by means of a thread rolling technique, and other different but nevertheless satisfactory thread forms could be produced by use of other techniques, such as thread cutting. Regardless of how the thread is formed it is preferred that the angle B is closer to 90° than is the angle C, and in some circumstances angle B could be 90°. In general however, it is preferred that angle B is in the range 80° to 90° so as to minimize angle A as shown by FIG. 4.

Tests conducted with fasteners having the thread form of FIG. 7 reveal a substantial improvement over fasteners having a conventional thread form, such as the thread form shown by FIGS. 4 and 5. Resistance to pull-out under a static load is 30% greater than that of conventional fasteners, and the improvement is as high as 200% in the case of a cyclic load intended to simulate strong or cyclonic wind conditions.

It is preferred that the drilling portion 104 of the fastener 103 is of the kind having a substantially cylindrical cross sectional shape and having two diametrically opposed flutes 119, as shown in FIG. 9, each of which extends generally in the axial direction of the fastener 103. The terminal end of the tip 104 may be formed by two sloping end faces 120 and a substantially straight cutting edge 121 is formed at the junction between each face 120 and a respective one of the flutes 119. Drill tips of that general configuration are known.

In the particular example shown by FIG. 8 the fastener 103 has an elongate shank 122 and a head 123 at the end of that shank remote from the drill tip 104. It will be appreciated that the head 123 can be of a form distinctly different to that shown by FIG. 8. The shank 122 as shown is formed of three major portions, a threaded portion X, a drilling portion Y and a head portion Z, but it is to be understood that the head portion Z could be omitted so that the thread extends up to the head 123. Assuming the unthreaded head portion Z is provided it can be of any suitable length, and will usually have a diameter substantially the same as the root diameter 124 of the thread (see FIG. 7).

It is preferred, as shown, that the threaded portion X is tapered over part of its length adjacent the drilling portion Y. That is, the thread crest diameter in the section marked "T" in FIG. 8 progressively increases from a minimum adjacent the drilling portion Y to a maximum remote from the drilling portion Y. The minimum diameter could be substantially zero thread height, and the maximum is preferably the standard crest diameter of the thread in the remainder of the shank portion X. Such a tapered arrangement promotes proper co-action between the threaded portion X and the hole 12 formed by the drill tip 104.

It is further preferred that the drilling portion Y is relatively long so as to cope with the existence of a relatively large gap G as previously discussed with reference to FIG. 2. A long drilling portion Y increases the probability that a hole will be formed through the lowermost wall 5 of overlapped battens 2 before the threaded portion X enters the hole previously formed in the uppermost wall 5 (FIG. 2). By way of example, a fastener having a thread crest diameter (standard or maximum) of approximately 6 millimeters may have a drilling portion approximately 12 millimeters in length, but other crest diameter to length relationships could be adopted.

The flutes 119 need not extend the full length of the drilling portion Y. In an example fastener according to the invention each flute 119 has a length in the range of two thirds to three quarters the length of the drilling portion Y.

It will be appreciated from the foregoing description that a fastener incorporating the features of the invention provides a major advantage over conventional fasteners of the same general kind. The significantly improved resistance to pull-out is a very important benefit, and that benefit is augmented by the fact that the particular fastener described is easy to use and enables rapid fastening of the members with which it is associated. A fastening system involving use of the fastener is accordingly a major improvement over conventional systems.

Finally, it is to be understood that various alterations, modifications and/or additions may be introduced into the constructions and arrangements of parts previously described without departing from the ambit of the invention as defined by the following claims.

We claim:

1. A screw threaded fastener, comprising:
   an elongate shank having a longitudinal axis; a drilling tip, having a predetermined diametrical extent, at one end of said elongate shank for drilling a hole within a member; a head at the opposite end of said elongate shank; and a screw thread extending over at least a part of the length of said elongate shank;
   wherein said screw thread comprises a leading flank which slopes outwardly at a first predetermined angular disposition with respect to said longitudinal axis of said elongate shank and in a direction away from said drilling tip, and a trailing flank which extends outwardly at a second predetermined angular disposition with respect to said longitudinal axis of said elongate shank which is a different angular disposition than said first predetermined angular disposition of said leading flank, said second predetermined angular disposition of said trailing flank being closer to 90° than said first predetermined angular disposition of said leading flank; and
   wherein further said screw thread comprises a first threaded portion having a first constant thread crest diameter and a first constant thread root diameter, a first end disposed toward said head end of said elongate shank, and a second end disposed toward said drilling tip, and a second threaded portion interposed between said second end of said first threaded portion and said drilling tip and having a tapered thread crest diameter and a tapered thread root diameter with a first larger end of said second threaded portion having a thread crest diameter and a thread root diameter substantially equal respectively to said first constant thread crest diameter and said first constant thread root diameter of said first threaded portion, and a second smaller end of said second threaded portion having a thread crest diameter and a thread root diameter which corresponds substantially to at least said predetermined diametrical extent of said drilling tip so as to promote proper co-action between said first threaded portion of said screw thread and the hole formed within the member by said drilling tip.

2. A screw threaded fastener as claimed in claim 1 wherein the second predetermined angular disposition of the trailing flank relative to the longitudinal axis is an angle in the range 80° to 90°.

3. A screw threaded fastener as claimed in claim 2 wherein the second predetermined angular disposition of the trailing flank relative to the longitudinal axis is an angle in the range 83° to 90°.

4. A screw threaded fastener as claimed in claim 3 wherein the second predetermined angular disposition of the trailing flank relative to the longitudinal axis is substantially 90°.

5. A screw threaded fastener as claimed in claim 3 wherein the second predetermined angular disposition of the trailing flank relative to the longitudinal axis is substantially 83° and the first predetermined angular disposition of the leading flank relative to the longitudinal axis is substantially 60°.

6. A screw threaded fastener as claimed in claim 1, wherein:
   said elongate shank includes a drilling portion which terminates at said drilling tip;
   said drilling portion has two flutes formed therein upon diametrically opposite sides of said longitudinal axis of said elongate shank, each flute extending from said drilling tip substantially in the direction of said longitudinal axis of said elongnate shank; and
   said drilling tip comprises two end faces wherein each end face slopes outwardly from said longitudinal axis of said elongate shank and in a direction towards said head of said fastener.

7. A screw threaded fastener as claimed in claim 6 wherein the drilling portion has a maximum cross sectional dimension which is substantially equal to a root diameter of the screw thread of the fastener.

8. A screw threaded fastener as claimed in claim 6 wherein the drilling portion is substantially cylindrical.

9. A screw threaded fastener as claimed in claim 1, wherein:

said elongate shank includes a drilling portion which terminates at said drilling tip; and said crest diameter of said screw thread progressively increases from a minimum value to a maximum value in the direction extending from said drilling tip towards said head of said fastener.

10. A screw threaded fastener as claimed in claim 6 wherein the drilling portion has a length which is up to substantially twice the crest diameter of the thread.

11. A screw threaded fastener as claimed in claim 6 wherein the flutes in the drilling portion have a length which is in the range of two thirds to three quarters of the length of the drilling portion.

12. A fastening system, comprising:

a sheet of roofing material;

a pair of thin metal battens respectively having overlapping regions including overlapped support walls, for supporting said sheet of roofing material, separated from each other by a predetermined space; and at least one screw threaded fastener comprising an elongate shank having a longitudinal axis; a drilling tip, having a predetermined diametrical extent, at one end of said elongate shank for respectively drilling first and second holes within said overlapped support walls of said pair of thin metal battens; a head at the opposite end of said elongate shank; and a screw thread extending over at least a part of the length of said elongate shank;

wherein said at least one screw threaded fastener extends through said sheet of roofing material such that said screw head is engaged with said sheet of roofing material, said screw thread is threadably engaged with said overlapped support walls of said pair of thin metal battens so as to thereby attach said sheet of roofing material to said overlapped support walls of said pair of thin metal battens, and said drilling point has a length dimension which is greater than said predetermined space defined between said overlapped support walls of said pair of thin metal battens such that said drilling point can drill said second hole within a second one of said overlapped support walls of said pair of thin metal battens, after having drilled said first hole within a first one of said overlapped support walls of said pair of thin metal battens, prior to threaded engagement of said screw thread with said first one of said overlapped support walls of said pair of thin metal battens;

wherein said screw thread comprises a first threaded portion having a constant thread crest diameter, a first end of said first threaded portion being disposed toward said head end of said elongate shank, and a second end of said first threaded portion being disposed toward said drilling tip; and a second threaded portion interposed between said second end of said first threaded portion and said drilling tip and having a tapered thread crest diameter with a first larger end thereof having a thread crest diameter substantially equal to said thread crest diameter of said first threaded portion, and a second smaller end thereof having a thread crest diameter which corresponds substantially to at least said predetermined diametrical extent of said drilling tip so as to promote proper co-action between said first threaded portion of said screw thread and said first and second holes formed within said pair of overlapped support walls of said pair of thin metal battens by said drilling tip; and wherein said screw thread comprises a leading flank which slopes outwardly at a first predetermined angular disposition with respect to said longitudinal axis of said elongate shank and in a direction away from said drilling tip, and a trailing flank which extends outwardly at a second predetermined angular disposition with respect to said longitudinal axis of said elongate shank which is a different angular disposition than said first predetermined angular disposition of said leading flank, said second predetermined angular disposition of said trailing flank being closer to 90° than said first predetermined angular disposition of said leading flank and subtending an angle relative to each one of said overlapped support walls of said pair of thin metal battens of not more than about 10° such that said trailing flank of said screw thread extends substantially parallel to each one of said support walls of said pair of thin metal battens surrounding said at least one screw threaded fastener when said screw threaded fastener is threadably engaged with said overlapped support walls of said pair of thin metal battens.

13. A fastening system as claimed in claim 12 wherein said subtended angle is substantially 7°.

14. A fastening system as claimed in claim 12 wherein said subtended angle is between 0° and 7°.

15. A fastening system as claimed in claim 12, further comprising:

a second thin metal batten having an end which overlaps an end of said at least one thin metal batten whereby a gap exists between corresponding support walls of said overlapped thin metal battens;

wherein said screw threaded fastener is threadably engaged in each one of said support walls of said overlapped thin metal battens; and wherein said elonqate shank of said screw threaded fastener includes a drilling portion which terminates at said drilling tip, said drilling portion having a length which is greater than said gap defined between said support walls of said overlapped thin metal battens.

16. A screw threaded fastener for attaching roofing material to a support structure, comprising:

an elongate shank having a longitudinal axis; a drilling tip, having a predetermined diametrical extent, at one end of said elongate shank for drilling a hole within a roofing member; a head at the opposite end of said elongate shank; and a screw thread extending over at least a part of the length of said elongate shank;

wherein said screw thread comprises a leading flank which slopes outwardly at a first predetermined angular disposition with respect to said longitudinal axis of said elongate shank and in a direction away from said drilling tip, and a trailing flank which extends outwardly at a second predetermined angular disposition with respect to said longitudinal axis of said elongate shank which is a different angular disposition than said first predetermined angular disposition of said leading flank, said second predetermined angular disposition of said trailing flank being closer to 90° than said first predetermined angular disposition of said leading flank; and wherein further said screw thread comprises a first threaded portion having a first constant thread crest diameter and a first constant thread root diameter, a first end of said first threaded portion being disposed toward said head end of said elongate shank, and a second end of said first threaded portion being disposed toward said drilling tip; and a second threaded portion interposed between said second end of said first threaded portion and said drilling tip and having a tapered thread crest diameter and a tapered thread root diameter with a first larger end of said second threaded portion having a thread crest diameter and a thread root diameter substantially equal respectively to said first constant thread crest diameter and said first constant thread root diameter of said first threaded portion, and a second smaller end of said second threaded portion having a thread crest diameter and a thread root diameter which corresponds substantially to at least said predetermined diametrical extent of said drilling tip so as to promote proper co-action between said first threaded portion of said screw thread and the hole formed within the roofing member by said drilling tip;

whereby when said fastener extends through the roofing member such that said screw head is engaged with the roofing member and said screw thread is threadably engaged with the support structure so as to thereby attach the roofing member to the support structure, said trailing flank of said screw thread will extend substantially parallel to the support structure surrounding said at least one screw threaded fastener so as to minimize distortion of the support structure under high load pull-out conditions.

17. The fastener as set forth in claim 16, wherein:
said second predetermined angular disposition of said trailing flank of said screw thread relative to said longitudinal axis of said elongate shank comprises an angle which is within the range of 80° to 90°.

18. The fastener as set forth in claim 17, wherein:
said second predetermined angular disposition of said trailing flank of said screw thread relative to said longitudinal axis of said elongate shank comprises an angle which is within the range of 83° to 90°.

19. The fastener as set forth in claim 18, wherein:
said second predetermined angular disposition of said trailing flank of said screw thread relative to said longitudinal axis of said elongate shank comprises an angle which is substantially 90°.

20. The fastener as set forth in claim 16, wherein:
said second predetermined angular disposition of said trailing flank of said screw thread relative to said longitudinal axis of said elongate shank comprises an angle, which is substantially 83°, and said first predetermined angular disposition of said leading flank of said screw thread relative to said longitudinal axis of said elongate shank comprises an angle which is substantially 60°.

* * * * *